United States Patent
Hisakado et al.

(10) Patent No.: US 7,495,730 B2
(45) Date of Patent: Feb. 24, 2009

(54) LIQUID CRYSTAL DISPLAY HAVING PARTICULAR OPTICAL COMPENSATORY SHEET

(75) Inventors: Yoshiaki Hisakado, Minami-ashigara (JP); Ryouta Matsubara, Minami-ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 376 days.

(21) Appl. No.: 11/363,055

(22) Filed: Feb. 28, 2006

(65) Prior Publication Data

US 2006/0203161 A1   Sep. 14, 2006

(30) Foreign Application Priority Data

Mar. 1, 2005   (JP) ............................. 2005-056359

(51) Int. Cl.
*G06F 1/1335* (2006.01)
(52) U.S. Cl. .................. 349/117; 349/119; 349/121
(58) Field of Classification Search ............... 349/117, 349/119, 121
See application file for complete search history.

(56) References Cited

U.S. PATENT DOCUMENTS

| | | | |
|---|---|---|---|
| 6,064,457 A * | 5/2000 | Aminaka | 349/117 |
| 6,897,303 B2 * | 5/2005 | Yamada | 536/58 |
| 6,922,222 B2 * | 7/2005 | Miyachi et al. | 349/118 |
| 7,315,341 B2 * | 1/2008 | Nimura et al. | 349/117 |
| 7,318,951 B2 * | 1/2008 | Nimura et al. | 428/1.1 |
| 7,324,177 B2 * | 1/2008 | Kawanishi et al. | 349/112 |
| 7,379,131 B2 * | 5/2008 | Ito et al. | 349/96 |
| 2002/0045015 A1 * | 4/2002 | Ito | 428/1.2 |

* cited by examiner

*Primary Examiner*—Mike Qi
(74) *Attorney, Agent, or Firm*—Buchanan Ingersoll & Rooney PC (57) ABSTRACT

A liquid crystal display comprising a pair of polarizing films, a liquid crystal cell placed between the polarizing films, and an optical compensatory sheet placed between the liquid crystal cell and at least one of the polarizing films, wherein the optical compensatory sheet comprises an optically anisotropic layer (1) and an optically anisotropic layer (2), and satisfies the following condition: $2.0 \leq (\Delta n \times d)/Rth(2) \leq 5.0$ wherein $\Delta n$ is a birefringence of a liquid crystal molecule in the liquid crystal cell, d is a thickness (nm) of the liquid crystal cell, and Rth(2) is an Rth value of the optically anisotropic layer (2).

8 Claims, 4 Drawing Sheets

LIQUID CRYSTAL DISPLAY HAVING PARTICULAR OPTICAL COMPENSATORY SHEET

BACKGROUND OF THE INVENTION

1. Field of the Invention

The present invention relates to a liquid crystal display, particularly to a bend alignment mode liquid crystal display.

2. Description of the Related Art

Liquid crystal displays (LCDs) are advantageous in smaller thicknesses, lighter weights, lower power consumptions, etc. as compared with cathode ray tubes (CRTs). The liquid crystal displays have a liquid crystal cell and a pair of polarizing plates placed at both sides of the cell. The liquid crystal cell contains liquid crystal molecules, two substrates for enclosing the molecules, and an electrode layer for applying voltage to the molecules. An alignment layer is generally formed on the substrates to align the enclosed liquid crystal molecules. An optical compensatory sheet (a retardation sheet) is often formed between the liquid crystal cell and the polarizing plates to remove undesired coloration of an image in the liquid crystal cell. The stack of the polarizing plates (polarizing films) and the optical compensatory sheet acts as an ellipsoidal polarizing plate. The optical compensatory sheet can have a function of enlarging a viewing angle of the liquid crystal cell. Stretched birefringent films have been used as the optical compensatory sheet.

Also optical compensatory sheets having an optically anisotropic layer containing a discotic compound, which can be used instead of the stretched birefringent films, have been proposed in JP-A-6-214116, U.S. Pat. Nos. 5,583,679 and 5,646,703, German Patent No. 3,911,620 A1, etc. The optically anisotropic layer is formed by aligning the discotic compound and by fixing the alignment state. The discotic compound generally has a large birefringence. Further, the discotic compound can be in various alignment states. Thus, the discotic compound can be used for producing an optical compensatory sheet with nonconventional optical properties, which the stretched birefringent films cannot have.

For example, proposed in U.S. Pat. Nos. 4,583,825 and 5,410,422, etc. are liquid crystal displays using a bend alignment mode liquid crystal cell containing rodlike liquid crystal molecules. In the bend alignment mode liquid crystal cell, the rodlike liquid crystal molecules in the upper portion and the molecules in the lower portion are aligned in substantially opposite directions (symmetrically), whereby the liquid crystal cell has a self-optical compensatory function. Thus, the liquid crystal mode is referred to also as an OCB (Optically Compensatory Bend) liquid crystal mode. The bend alignment mode liquid crystal displays are advantageous in high response speeds.

The bend alignment mode is characterized in wider viewing angle and higher response speed as compared with common liquid crystal modes such as TN and STN modes. However, in comparison to the CRTs, even the bend alignment mode displays have to be further improved. It seems possible that the bend alignment mode liquid crystal displays can be further Improved by using an optical compensatory sheet as the common liquid crystal mode displays. However, the conventional optical compensatory sheets of the stretched birefringent films show insufficient optical compensatory function in the bend alignment mode liquid crystal displays. Use of the optical compensatory sheets having a transparent support and an optically anisotropic layer containing a discotic compound instead of the stretched birefringent films has been proposed as described above. Also bend alignment mode liquid crystal displays using an optical compensatory sheet containing a discotic compound have been proposed in JP-A-9-197397, WO 96/37804, etc. By using the optical compensatory sheet containing a discotic compound, viewing angle of the bend alignment mode liquid crystal displays is remarkably improved.

It has been pointed out in JP-A-11-316378, etc. that, when the optical compensatory sheet containing a discotic compound is used in the bend alignment mode liquid crystal displays, a particular wavelength light leaks to cause undesired coloration of an image. It is reported that the coloration is caused because transmittance of an ellipsoidal polarizing plate (a stack of polarizing films and an optical compensatory sheet) depends on wavelength. Further, it is reported that a maximum optical compensatory effect for a bend alignment mode liquid crystal cell can be achieved by arranging an optically anisotropic layer and polarizing films such that an angle of an average orthographic projection of a discotic plane normal line of a discotic compound to an optically anisotropic layer against an in-plane transmission axis of polarizing films is substantially 45°.

Various proposals have been made on reduction of undesired coloration and prevention of tone reversal in the bend alignment mode liquid crystal displays using the optical compensatory sheet containing a discotic compound in Japanese Patent No. 3056997, JP-A-2002-40429, etc.

SUMMARY OF THE INVENTION

As described above, it is difficult to prevent tone reversal in the liquid crystal displays while maintaining satisfactory contrast and viewing angle even in the case of using the optical compensatory sheet containing a discotic compound.

An object of the present invention is to provide a liquid crystal display capable of displaying an image with high contrast, excellent viewing angle, and no tone reversal by optically compensating a bend alignment mode liquid crystal cell appropriately to remarkably reduce transmittance in the polar angle directions of front, left, right, up, and down at the time of black level.

Thus, in the invention, the object has been achieved by the following liquid crystal display of (1) to (8).

(1) A liquid crystal display comprising a pair of polarizing films, a liquid crystal cell placed between the polarizing films, and an optical compensatory sheet placed between the liquid crystal cell and at least one of the polarizing films, wherein the optical compensatory sheet comprises an optically anisotropic layer (1) and an optically anisotropic layer (2), and satisfies the following condition:

$$2.0 \leq (\Delta n \times d)/Rth(2) \leq 5.0$$

wherein $\Delta n$ is a birefringence of a liquid crystal molecule in the liquid crystal cell, d is a thickness (nm) of the liquid crystal cell, and $Rth(2)$ is an Rth value of the optically anisotropic layer (2).

(2) The liquid crystal display of (1), wherein the optically anisotropic layer (1) has an Re value of 0 to 40 nm.

(3) The liquid crystal display of (1) or (2), wherein the optically anisotropic layer (2) has an Re value of 20 to 60 nm and an Rth value of 100 to 300 nm.

(4) The liquid crystal display of any one of (1) to (3), wherein the optically anisotropic layer (1) has $Re(40)/Re(-40)$ of 3 to 20 when Re values of the optically anisotropic layer (1) are each measured at an elevation angle of plus or minus 40° using a retardation axis of the optically anisotropic layer (1) as an elevation axis, and Re(40) is a larger one of the Re values and Re(−40) is the other.

(5) The liquid crystal display of any one of (1) to (4), wherein the optically anisotropic layer (1) comprises a liquid crystalline compound.

(6) The liquid crystal display of any one of (1) to (4), wherein the optically anisotropic layer (1) comprises a discotic compound.

(7) The Liquid crystal display of any one of (1) to (6), wherein the optically anisotropic layer (2) comprises a cellulose acylate film.

(8) The liquid crystal display of any one of (1) to (7), wherein the liquid crystal cell is a bend alignment mode cell.

The liquid crystal display of the invention has remarkably improved contrast properties and viewing angle properties, and does not cause tone reversal. The liquid crystal display shows marked advantageous effects particularly in the case of a bend alignment mode.

BEST MODE FOR CARRYING OUT THE INVENTION

The present invention will be described in detail below. It should be noted that the term "a numeric value to a numeric value" means a range including both the numeric values as the minimum value and maximum value in the invention.

[Liquid Crystal Display and Polarizing Plate]

The liquid crystal display of the invention is preferably a bend alignment mode liquid crystal display. The bend alignment mode liquid crystal display will be described below.

Figure 1:
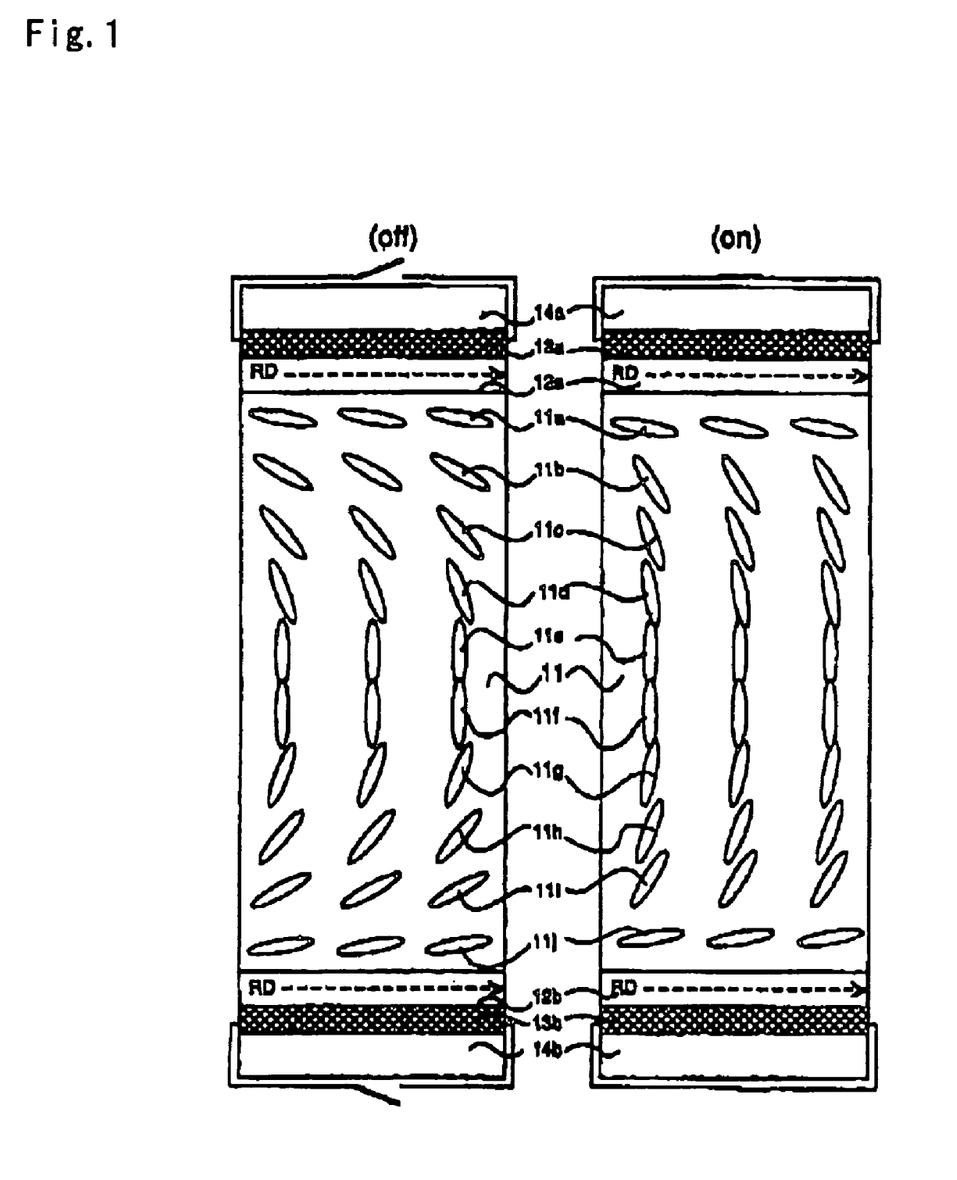
FIG. 1 is a cross-sectional view showing alignment of liquid crystalline compound in a bend alignment mode liquid crystal cell schematically.

FIG. 1 is a cross-sectional view showing alignment of a liquid crystalline compound in a bend alignment mode liquid crystal cell schematically. As shown in FIG. 1, the bend alignment mode liquid crystal cell contains an upper substrate 14a and a lower substrate 14b, and a liquid crystalline compound 11 enclosed between the substrates. The liquid crystalline compound 11 used in the bend alignment mode liquid crystal cell generally has a positive dielectric anisotropy. In the liquid crystal cell, the upper substrate 14a and the lower substrate 14b have an alignment layer 12a, 12b and an electrode layer 13a, 13b, respectively. The alignment layers have a function of aligning rodlike liquid crystal molecules 11a to 11j. RD's represent rubbing directions of the alignment layers. The electrode layers have a function of applying voltage to the rodlike liquid crystal molecules 11a to 11j.

As shown in (off) of FIG. 1, when a low voltage is applied to the bend alignment mode liquid crystal cell, the rodlike liquid crystal molecules 11a to 11e near the upper substrate 14a and the molecules 11f to 11j near the lower substrate 14b are aligned in opposite directions (symmetrically) in the cell. The rodlike liquid crystal molecules 11a, 11b, 11i, and 11j positioned nearer the substrates 14a and 14b are aligned approximately horizontally, and the rodlike liquid crystal molecules 11d to 11g in the central part of the liquid crystal cell are aligned approximately vertically.

As shown in (on) of FIG. 1, when a high voltage is applied to the liquid crystal cell, the rodlike liquid crystal molecules 11a and 11j near the substrates 14a and 14b are still aligned approximately horizontally, and the molecules 11e and 11f in the central part of the liquid crystal cell are aligned approximately vertically. The alignment change due to the voltage increase is caused in the rodlike liquid crystal molecules 11b, 11c, 11d, 11g, 11h, and 11i positioned between the substrates and the central part of the liquid crystal cell, and these molecules are more vertically aligned in the on state than in the off state. As in the case of the off state, the rodlike liquid crystal molecules 11a to 11e near the upper substrate 14a and the molecules 11f to 11j near the lower substrate 14b are aligned in opposite directions (symmetrically) in the cell also in the off state.

Figure 2:
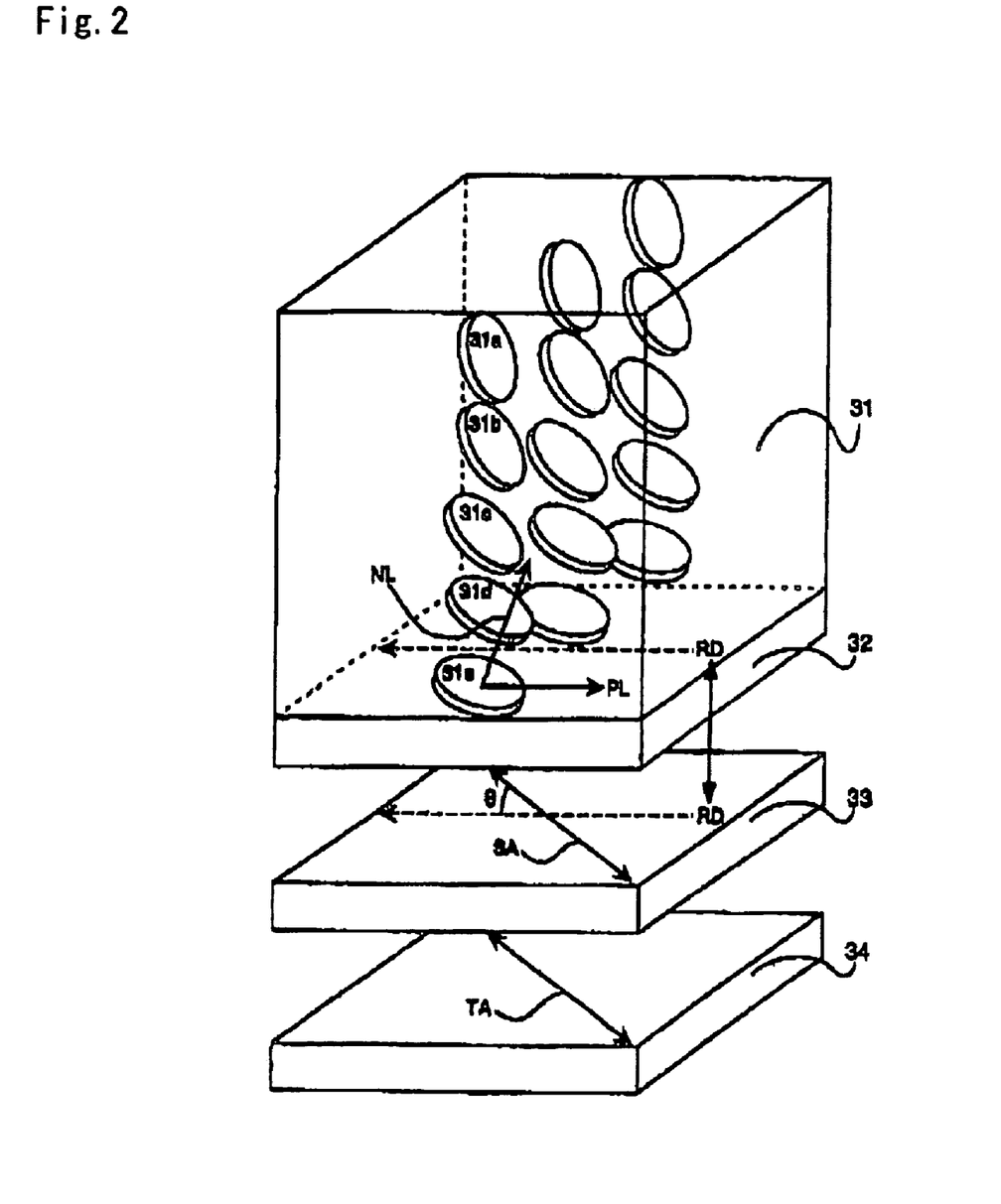
FIG. 2 is a schematic view showing a polarizing plate.

FIG. 2 is a schematic view showing a polarizing plate. The polarizing plate shown in FIG. 2 comprises a stack of an optically anisotropic layer (1) 31 containing discotic compound molecules 31a to 31e, an optically anisotropic layer (2) 33 containing at least one cellulose acylate film, and a polarizing film 34. The polarizing plate of FIG. 2 has an alignment layer 32 between the optically anisotropic layer (1) 31 and the optically anisotropic layer (2) 33. The discotic compound molecule 31a to 31e in the optically anisotropic layer (1) 31 are planar molecules. Each of the discotic compound molecules 31a to 31e has only one discotic plane. The discotic planes are tilted to a surface of the optically anisotropic layer (2) 33. Angles of the discotic planes against the optically anisotropic layer (2) surface (tilt angles) are increased with increasing distances of the discotic compound molecules from the alignment layer. The average tilt angle of the discotic compound is preferably within a range of 15 to 50°. By varying the tilt angles as shown in FIG. 2, the viewing angle enlarging function of the polarizing plate is remarkably increased. Further, the polarizing plate with varied tilt angles has also a function of preventing undesired image inversion, tone variation, or coloration. A direction PL is obtained by orthogonally projecting the normal line NL of the discotic plane of each discotic compound molecule 31a to 31e on the optically anisotropic layer (2) 33, and the average of the directions PL is antiparallel to the rubbing direction RD of the alignment layer 32.

In the invention, it is preferred that an angle of the average of the directions PL, obtained by orthogonally. projecting the normal line NL of each discotic plane on the optically anisotropic layer (2), against the in-plane retardation axis SA of the optically anisotropic layer (2) 33 be substantially 45°. Thus, it is preferred that an angle θ between the rubbing direction RD of the alignment layer 32 and the in-plane retardation axis SA of the optically anisotropic layer (2) is controlled at substantially 45° to produce the polarizing plate. Further, in the invention, the optically anisotropic layer (2) and the polarizing films are preferably disposed such that the in-plane retardation axis SA of the optically anisotropic layer (2) is substantially parallel or vertical to the in-plane transmission axis TA of the polarizing film 34. In the polarizing plate shown in FIG. 2, the one optically anisotroplc layer (2) is placed parallel to the in-plane transmission axis TA. The in-plane retardation axis SA of the optically anisotropic layer (2) 33 corresponds to the stretching direction of the optically anisotropic layer (2) in principle. The in-plane transmission axis TA of the polarizing film 34 corresponds to a direction perpendicular to the stretching direction of the polarizing film in principle.

Figure 3:
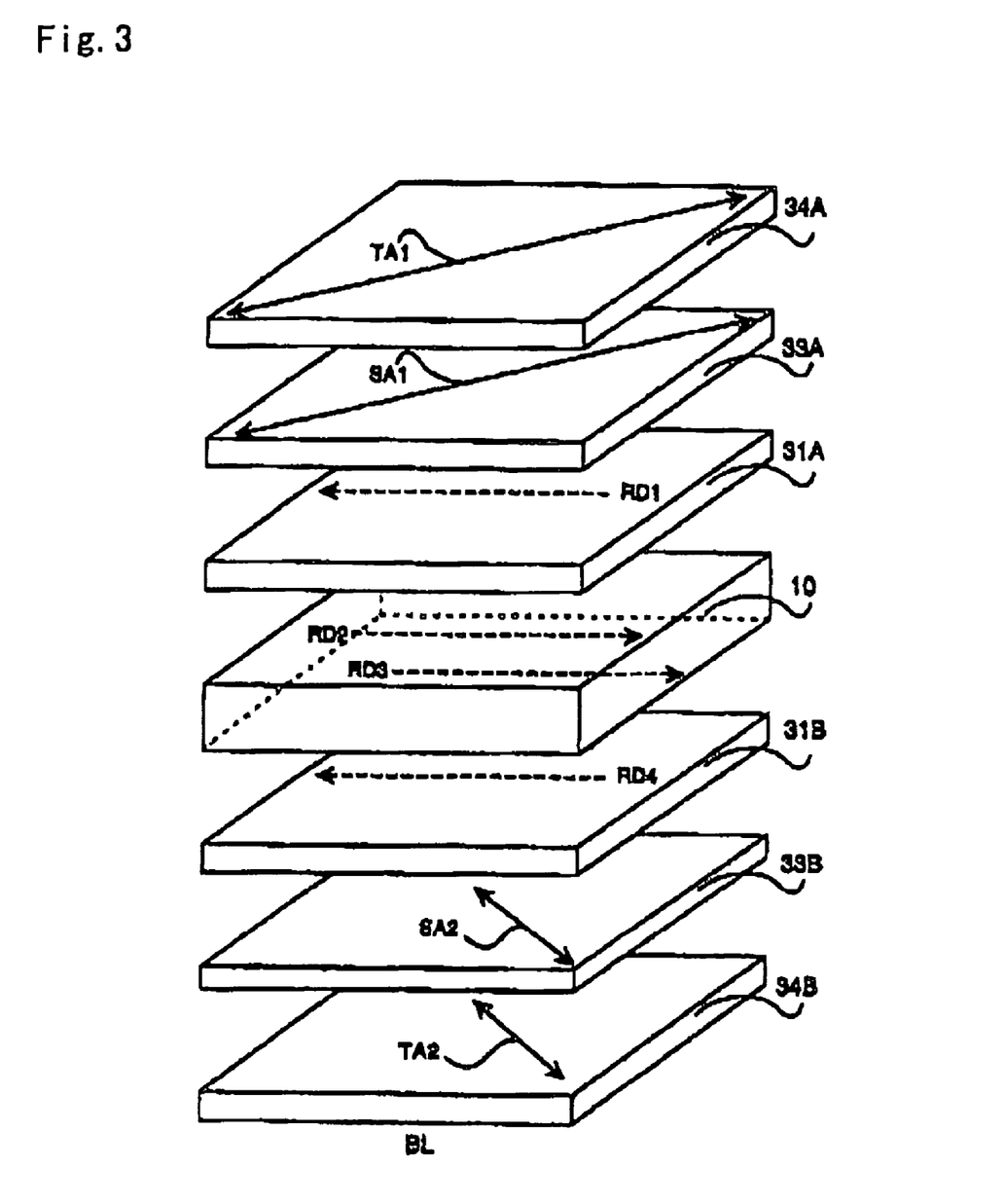
FIG. 3 is a schematic view showing a bend alignment mode liquid crystal display according to the present invention.

FIG. 3 is a schematic view showing a preferred bend alignment mode liquid crystal display according to the invention. The liquid crystal display shown in FIG. 3 has a bend alignment mode liquid crystal cell 10, a pair of polarizing plates including 31A, 33A, 34A, 31B, 33B, and 34B placed on the both sides of the cell, and a backlight BL. The bend alignment mode liquid crystal cell 10 corresponds to the liquid crystal cell shown in FIG. 1. Rubbing directions RD2 and RD3 of the upper and lower surfaces of the liquid crystal cell 10 are equal (parallel) to each other. In the polarizing plates, optically anisotropic layers (1) 31A and 31B, optically anisotropic layers (2) 33A and 33B, and polarizing films 34A and 34B are stacked in this order on the liquid crystal cell 10. In the optically anisotropic layers (1) 31A and 31B, rubbing directions RD1 and RD4 of discotic compound molecules are antiparallel to the rubbing directions RD2 and RD3 of the liquid crystal cell respectively. As described above, the rubbing directions RD1 and RD4 of the discotic compound are antiparallel to the average of the directions obtained by orthogonally projecting the normal line of each discotic plane on each optically anisotropic layer (2). The in-plane retardation axes SA1 and SA2 of the optically anisotropic layers (2) 33A and 33B, and the in-plane transmission axes TA1 and TA2 of the polarizing films 34A and 34B are substantially at an angle of 45° to the rubbing directions RD1 and RD4 of the discotic compound in the same plane. And the two polarizing films 34A and 34B are disposed such that the in-plane transmission axes TA1 and TA2 are perpendicular to each other (in the crossed nicols state).

[Polarizing Plate]

The optically anisotropic layer (2) and the optically anisotropic layer (1) are attached to a polarizing film and used as a polarizing plate.

The polarizing films include alignment type polarizing films and coating type polarizing films such as those available from Optiva Inc. The alignment type polarizing films preferably contain iodine or a dichroic dye in combination with a binder. The iodine or dichroic dye is aligned to show polarizing properties in the binder. It is preferred that the iodine or dichroic dye is aligned along the binder molecules, or the dichroic dye is self-assembled as liquid crystalline compounds and aligned in one direction.

Commercially available alignment type polarizing films are generally produced by soaking a stretched polymer in a solution of the iodine or dichroic dye in a bath, thereby penetrating the iodine or dichroic dye into the binder. Further, the iodine or dichroic dye is distributed in a region within a distance of approximately 4 μm (total 8 μm on both sides) from the polymer surface in the commercially available polarizing films, and it is preferred that the thickness is 10 μm or more from the viewpoint of achieving a sufficient polarizing performance. The degree of the penetration can be controlled by selecting the concentration of the solution of the iodine or dichroic dye, the bath temperature, or the soaking time.

The thickness of the polarizing film is preferably equal to or less than those of commercially available polarizing plates (30 μm), more preferably 25 μm or less, further preferably 20 μm or less. When the thickness is 20 μm or less, light leakage is not caused in a 17-inch liquid crystal display.

The binder of the polarizing film may be crosslinked. As the binder of the polarizing film, a polymer that can be crosslinked per se may be used. The polarizing film may be formed such that a polymer having a functional group or a polymer prepared by introducing a functional group to a precursor is crosslinked by a reaction of the functional group under a light, heat, or a pH variation. A crosslinking agent may be used to introduce a crosslinked structure to the polymer. Thus, the crosslinking agent of a high-reactive compound is used to introduce a linking group to the binder from the crosslinking agent, and the binder can be crosslinked to form the polarizing film.

The crosslinking is generally carried out by applying a coating liquid containing the crosslinkable polymer or a mixture of the polymer and the crosslinking agent to a transparent support, and by heating the applied liquid. The crosslinking may be carried out at any time in the production of the polarizing plate because only the final product needs to have a sufficient durability.

The binder of the polarizing film may be the polymer capable of being crosslinked per se or being crosslinked by the crosslinking agent. Examples of the polymers include polymethyl methacrylates, polyacrylic acids, polymethacrylic acids, polystyrenes, polyvinyl alcohols, modified polyvinyl alcohols, poly(N-methylolacrylamide)s, polyvinyltoluenes, chlorosulfonated polyethylenes, nitrocelluloses, chlorinated polyolefins such as polyvinylchlorides, polyesters, polyimides, polyvinyl acetates, polyethylenes, carboxymethylcelluloses, polypropylenes, polycarbonates, and copolymers thereof such as acrylic acid/methacrylic acid copolymers, styrene/maleinimide copolymers, styrene/vinyltoluene copolymers, vinyl acetate/vinyl chloride copolymers, and ethylene/vinyl acetate copolymers. A silane coupling agent may be used as the polymer. Preferred as the polymer are water-soluble polymers such as poly(N-methylolacrylamide)s, carboxymethylcelluloses, gelatins, polyvinyl alcohols, and modified polyvinyl alcohols, more preferred are gelatins, polyvinyl alcohols, and modified polyvinyl alcohols, and the most preferred are polyvinyl alcohols and modified polyvinyl alcohols.

The saponification degree of the polyvinyl alcohol or modified polyvinyl alcohol is preferably 70 to 100%, more preferably 80 to 100%, most preferably 95 to 100%. The polymerization degree of the polyvinyl alcohol is preferably 100 to 5,000.

A modification group may be introduced to the polyvinyl alcohol by copolymerization modification, chain transfer modification, or block polymerization modification to obtain the modified polyvinyl alcohol. Examples of the modification groups introduced by copolymerization include —COONa, —Si(OX)$_3$ (in which X is a hydrogen atom or an alkyl group), —N(CH$_3$)$_3$·Cl, —C$_9$H$_{19}$, —COO, —SO$_3$Na, and —Cl$_{12}$H$_{25}$. Examples of the modification groups introduced by chain transfer include —COONa, —SH, and —SC$_{12}$H$_{25}$. The polymerization degree of the modified polyvinyl alcohol is preferably 100 to 3,000. The modified polyvinyl alcohol is described in JP-A-8-338913, JP-A-9-152509, and JP-A-9-316127.

The polymer for the binder is particularly preferably an unmodified polyvinyl alcohol or an alkylthio-modified polyvinyl alcohol with a saponification degree of 85 to 95%.

Two or more of the polyvinyl alcohols and modified polyvinyl alcohols may be used in combination.

The crosslinking agent is described in U.S. Reissue Pat. No. 23297. Also a boron compound such as boric acid or borax may be used as the crosslinking agent.

The resistance of the polarizing film to moisture and heat can be improved by excessively adding the crosslinking agent to the binder. Further, deterioration of the alignment of the iodine or dichroic dye can be more effectively prevented by controlling the ratio of the crosslinking agent to the binder at 50% by mass or less. The ratio of the crosslinking agent to the binder is preferably 0.1 to 20% by mass, more preferably 0.5 to 15% by mass. After the crosslinking reaction, the binder contains a certain amount of unreacted crosslinking agent. The mass ratio of the residual crosslinking agent to the binder is preferably 1.0% by mass or less, more preferably 0.5% by mass or less. The mass ratio of 1.0% by mass or less results in a higher durability. In a case where a polarizing film with a large amount of the residual crosslinking agent is incorporated in a liquid crystal display and used or left under a high-temperature high-humidity environment over a long period of time, the polarization properties of the polarizing film are deteriorated. When the mass ratio is 1.0% by mass or less, such deterioration of the polarization properties can be effectively prevented.

The dichroic dyes include azo dyes, stilbene dyes, pyrazolone dyes, triphenylmethane dyes, quinoline dyes, oxazine dyes, thiazine dyes, and anthraquinone dyes. The dichroic dye is preferably water soluble. The dichroic dye preferably has a hydrophilic substituent such as a sulfo, amino, or hydroxyl group. Examples of the dichroic dyes include C.I. Direct Yellow 12, C.I. Direct Orange 39, C.I. Direct Orange 72, C.I. Direct Red 39, C.I. Direct Red 79, C.I. Direct Red 81, C.I. Direct Red 83, C.I. Direct Red 89, C.I. Direct Violet 48, C.I. Direct Blue 67, C.I. Direct Blue 90, C.I. Direct Green 59, and C.I. Acid Red 37. The dichroic dyes are described in JP-A-1-161202, JP-A-1-172906, JP-A-1-172907, JP-A-1-183602, JP-A-1-248105, JP-A-1-265205, and JP-A-7-261024.

The dichroic dye is used in the form of a free acid or a salt such as an alkali metal salt, an ammonium salt, or an amine salt. By combining two or more dichroic dyes, the polarizing film can have various hues. When a compound (a dye) that shows black color with polarizing axes intersected perpendicularly or various dichroic molecules combined for showing black color is used in the polarizing film, the resulting film is excellent in single-plate transmittance and polarizing properties.

The polarizing film is colorized by the iodine or dichroic dye after the binder is stretched to the longitudinal direction (MD direction) of the polarizing film (in a stretching method) or is rubbed (in a rubbing method).

In the stretching method, the stretch ratio is preferably 2.5 to 30.0 times, more preferably 3.0 to 10.0 times. The stretching is preferably carried out by dry stretching in the air. Further, the binder may be soaked in water and stretched by wet stretching. The stretch ratio in the dry stretching is preferably 2.5 to 5.0 times, and the stretch ratio in the wet stretching is preferably 3.0 to 10.0 times. The stretching may be carried out several times, so that the binder is stretched more uniformly even in the case of high-ratio stretching. Before the stretching, the binder may be slightly pre-stretched transversely or longitudinally to prevent shrinkage in the width direction.

From the viewpoint of yield, it is preferred that the binder is stretched at a tilt angle of 10 to 80 degrees against the longitudinal direction. In this case, biaxial stretching may be carried out such that entering is conducted in the left and right directions in the different manner. The biaxial stretching may be the same as those used in common film forming. In the biaxial stretching, the binder film is stretched leftward and rightward at different speeds, whereby the left part and the right part of the film need to have different thicknesses before the stretching. In the case of using a casting method, flow rates of a binder solution to the left and right can be differentiated by tapering the die.

The stretching is preferably carried out such that the tilt angle is equal to the angle of the transmission axis of 2 polarizing plates bonded on the both sides of the liquid crystal cell against the transverse or longitudinal direction of the liquid crystal cell. Though generally the tilt angle is 45°, it is preferred that the stretching direction can be freely controlled depending on the liquid crystal display because transmission-, reflection-, or semi-transmission-type liquid crystal displays not having the tilt angle of 45° have been developed recently.

As described above, the binder film is oblique-stretched at the tilt angle of 10 to 80 degrees against the MD direction of the polarizing film.

In the rubbing method, common rubbing treatments for aligning liquid crystals of liquid crystal displays may be used. Thus, the surface of the film may be rubbed with paper, gauze, felt, rubber, nylon, polyester fiber, etc. in a constant direction to obtain the alignment. The rubbing treatment is generally carried out such that the film is rubbed several times with a cloth woven from fibers with uniform length and width. In the rubbing, a rubbing roll having 30 μm or less of circularity, cylindricity, and deflection (eccentricity) is preferably used. The lap angle of the film to the rubbing roll is preferably 0.1 to 90°. The film may be wound around the roll at 360° or more to achieve a stable rubbing treatment as described in JP-A-8-160430.

In the case of rubbing a long film, the film is preferably transported at a rate of 1 to 100 m/min under a constant tensile force by a transport apparatus. The rubbing roll is preferably rotatable horizontally to the film transport direction to control the rubbing angle. It is preferred that the rubbing angle is appropriately selected within the range of 0 to 60°. In the case of using the film in liquid crystal displays, the rubbing angle is preferably 40 to 50°, particularly preferably 45°.

It is preferred that a protective film is disposed on both sides of the polarizing film, and a part of a roll optical compensatory sheet is preferably used as a protective film for one side. Preferred structures include stacks of the protective film/the polarizing film/the optically anisotropic layer (2)/the optically anisotropic layer (1), and stacks of the protective film/the polarizing film/the optically anisotropic layer (2)/the alignment layer/the optically anisotropic layer (1), which are formed in the order. The polarizing film may be bonded onto the optically anisotropic layer (1) surface. An adhesive may be used for bonding them. Preferred adhesives are aqueous boron compound solutions and polyvinly alcohol resins, which may be modified by an acetoacetyl group, a sulfonic acid group, a carboxyl group, or an oxyalkylene group, and more preferred adhesives are the polyvinyl alcohol resins.

The dry thickness of the adhesive layer is preferably within the range of 0.01 to 10 μm, particularly preferably within the range of 0.05 to 5 μm.

A light diffusion film or an antidazzle film may be bonded onto the polarizing plate surface.

Figure 4:
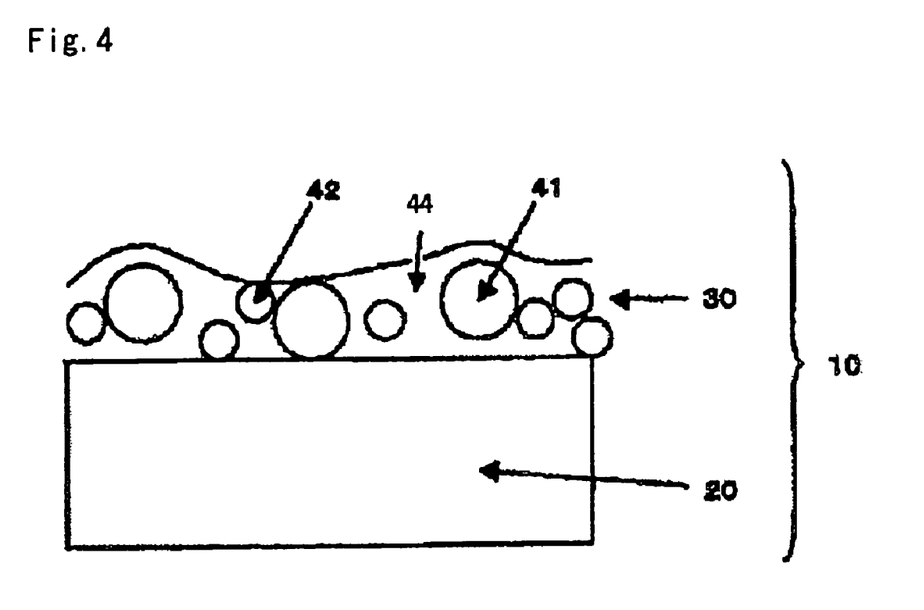
FIG. 4 is a schematic cross-sectional view showing a typical light diffusion film.

FIG. 4 is a schematic cross-sectional view showing a typical light diffusion film. The light diffusion film 10 shown in FIG. 4 has a transparent substrate film 20 and a light diffusion layer 30 formed thereon. The light diffusion layer contains first light transmittable particles 41 and second light transmittable particles 42 in a light transmittable resin 44. Explanation will be hereinafter made on two types of the light transmittable particles having different refractive indexes and different particle size distribution peaks though the same types of light transmittable particles having the same refractive index and different particle size distribution peaks or one type of light transmittable particles may be used.

For example, the first light transmittable particles 41 is composed of a light transmittable resin, for example, silica particles having an average particle size of 1.0 μm and a refractive index of 1.51, and the second light transmittable particles 42 is composed of styrene beads having an average particle size of 3.5 μm and a refractive index of 1.61. The light diffusion film shows the light diffusion function due to the difference of refractive indexes between the light transmittable resin 44 and the light transmittable particles 41 and 42. The difference of the refractive indexes is preferably 0.02 to 0.15. When the difference of the refractive indexes is 0.02 or more, the light diffusion film has more excellent light diffusion effect. When the difference is 0.15 or less, the film is effectively prevented from whitening entirely. The difference of the refractive indexes is more preferably 0.03 to 0.13, further preferably 0.04 to 0.10.

In the case of using the polarizing film in the liquid crystal display, it is preferred that an antireflection layer is formed on the display surface. The antireflection layer may act also as a protective layer on the display side of the polarizing film. It is preferred that the antireflection layer has internal haze of 50% or more from the viewpoint of preventing color variation depending on the viewing angle. The antireflection layer is described in JP-A-2001-33783, JP-A-2001-343646, and JP-A-2002-328228.

[Optically Anisotropic Layer (1)]

The optically anisotropic layer (1) preferably contains a liquid crystalline compound or a discotic compound, and more preferably contains a liquid crystalline discotic compound.

The Re value of the optically anisotropic layer (1), which is measured from the normal line direction of the film, is preferably 0 to 40 nm, more preferably 20 to 40 nm, further preferably 25 to 40 nm.

The optically anisotropic layer (1) is preferably designed for compensating the liquid crystal compound in the liquid crystal cell at the time of black level of the liquid crystal display. The alignment state of the liquid crystal compound in the liquid crystal cell is described in IDW'00, FMC7-2, p. 411 to 414.

The discotic compound is preferably a high- or low-molecular liquid crystalline compound having a discotic structure. The discotic compound may be such that the liquid crystalline compound is polymerized or crosslinked and loses the liquid crystallinity.

The discotic compounds include benzene derivatives described in C. Destrade, et al., *Mol. Cryst.*, Vol. 71, Page 111 (1981), truxene derivatives described in C. Destrade, et al., *Mol. Cryst.* Vol. 122, Page 141 (1985) and *Physics Lett.*, A, Vol. 78, Page 82 (1990), cyclohexane derivatives described in B. Kohne, et al., *Angew. Chem.*, Vol. 96, Page 70 (1984), and azacrown- or phenylacetylene-based macrocycles described in J. M. Lehn, et al., *J. Chem. Commun.*, Page 1794 (1985) and J. Zhang, et al., *J. Am. Chem. Soc.*, Vol. 116, Page 2655 (1994).

The discotic compound generally has a structure containing a core at the center of the molecule on which straight alkyl, alkoxy, or substituted benzoyloxy groups are radially substituted as side chains of the core. It is preferred that the discotic compound has rotation symmetry in the form of a molecule or a molecular assembly and can be in an alignment. The optically anisotropic layer (1) is formed from the discotic compound, and the compound does not need to have liquid crystallinity in the layer. For example, the discotic compound may be a low-molecular liquid crystalline discotic compound having a heat- or light-responsive group, and the compound may be polymerized or crosslinked by heat or light reaction to lose the liquid crystallinity. The discotic compound is described in JP-A-8-50206. Polymerization of the discotic compound is described in JP-A-8-27284.

A polymerizable group may be connected to the discotic core of the discotic compound as a substituent to fix the discotic compound by polymerization. The discotic core and the polymerizable group can be connected by a linking group, whereby the alignment is maintained after the polymerization. Such discotic compounds having a polymerizable group are described in JP-A-2000-155216, Paragraph 0151 to 0168.

In hybrid alignment of the discotic compound, the angles of the major axes (the discotic planes) of the discotic compound molecules against the polarizing film surface are increased or decreased as the distances from the polarizing film are increased in the depth direction of the optically anisotropic layer. The angles are preferably decreased along with the distance increase. Further, variation of the angles may be continuous increase, continuous decrease, intermittent increase, intermittent decrease, combination of continuous increase and continuous decrease, or combination of intermittent increase and decrease. In the case of the intermittent variation, there is an area with constant tilt angles in the middle of the layer. The layer may contain such an area with constant average angles as long as the angles are increased or decreased as a whole. It is preferred that the angles vary continuously.

The average direction of the major axes of the discotic compound on the side of the polarizing film can be controlled by selecting the discotic compound, a material for the alignment layer, or a rubbing treatment method. The direction of the major axes (the discotic planes) of the discotic compound on the front side (rear the air interface) can be controlled by selecting an additive used in combination with the discotic compound. Examples of the additives for use in combination with the discotic compound include plasticizers, surfactants, polymerizable monomers, and polymerizable polymers. The degree of alignment direction variation of the major axes can be controlled by selecting the discotic compound and the additive. The uniformity and strength of the layer, and the alignment of the discotic compound can be improved by the plasticizer, surfactant, or polymerizable monomer. It is preferred that the additive has compatibility to the discotic compound, can change the tilt angle of the discotic compound, and does not inhibit the alignment of the compound.

The polymerizable monomer may be a radical- or cation-polymerizable compound, and preferably a polyfunctional radical-polymerizable monomer. It is preferred that the monomer has a polymerizable group copolymerizable with a polymerizable group of the discotic compound. The polymerizable monomer is described in JP-A-2002-296423, Paragraph 0018 to 0020. The ratio of the polymerizable monomer to the discotic compound is preferably 1 to 50% by mass, more preferably 5 to 30% by mass.

The surfactant is preferably a fluorine compound. The surfactant is described in JP-A-2001-330725.

The polymer preferably generates variation of the tilt angles of the discotic compound.

The polymer is preferably a cellulose ester. The cellulose ester is described in JP-A-2000-155216, Paragraph 0178. The mass ratio of the polymer to the discotic compound is preferably 0.1 to 10% by mass, more preferably 0.1 to 8% by mass, from the viewpoint of not inhibiting the alignment of the discotic compound.

The phase transition temperature of the discotic compound between the discotic nematic liquid crystalline phase and the solid phase is preferably 70 to 300° C., more preferably 70 to 170° C.

The optically anisotropic layer (1) can be formed by applying a coating liquid containing the discotic compound to the alignment layer, and the coating liquid may contain a polymerization initiator or another component if necessary.

Organic solvents are preferably used as a solvent for the coating liquid. Examples of the organic solvents include amides such as N,N-dimethylformamide; sulfoxides such as dimethylsulfoxide; heterocyclic compounds such as pyridine; hydrocarbons such as benzene and hexane; alkyl halides such as chloroform, dichloromethane, and tetrachloroethane; esters such as methyl acetate and butyl acetate; ketones such as acetone and methyl ethyl ketone; and ethers such as tetrahydrofuran and 1,2-dimethoxyethane. Preferred organic solvents include alkyl halides and ketones. Two or more organic solvents may be used in combination.

The coating liquid may be applied by a known method such as a spin coating method, a wire-bar coating method, an extrusion coating method, a direct gravure coating method, a reverse gravure coating method, or a die coating method.

The thickness of the optically anisotropic layer (1) is preferably 0.1 to 20 μm, more preferably 0.5 to 15 μm, further preferably 1 to 10 μm.

The aligned discotic compound molecules may be fixed in the alignment state. The fixation is preferably achieved by polymerization. The polymerization may be heat polymerization using a heat polymerization initiator or photopolymerization using a photopolymerization initiator, and is preferably photopolymerization.

Examples of the photopolymerization initiators include α-carbonyl compounds described in U.S. Pat. Nos. 2,367,661 and 2,367,670; acyloin ethers described in U.S. Pat. No. 2,448,828; α-hydrocarbon-substituted, aromatic acyloin compounds described in U.S. Pat. No. 2,722,512; polynuclear quinone compounds described in U.S. Pat. Nos. 3,046,127 and 2,951,758; combinations of triarylimidazole dimers and p-aminophenyl ketone described in U.S. Pat. No. 3,549,367; acridine compounds and phenazine compounds described in JP-A-60-105667 and U.S. Pat. No. 4,239,850; and oxadiazole compounds described in U.S. Pat. No. 4,212,970.

The mass ratio of the photopolymerization initiator to the solid content of the coating liquid is preferably 0.01 to 20% by mass, more preferably 0.5 to 5% by mass.

In the photopolymerization, the liquid crystal molecules are preferably irradiated with ultraviolet ray.

The irradiation energy is preferably 20 mJ/cm$^2$ to 50 J/cm$^2$, more preferably 20 to 5,000 mJ/cm$^2$, further preferably 100 to 800 mJ/cm$^2$. The irradiation may be carried out under a heating condition to accelerate the photopolymerizatior.

A protective layer may be formed on the optically anisotropic layer (1).

[Alignment Layer]

The alignment layer may act to determine the alignment of the liquid crystal molecules in the optically anisotropic layer (1). When the liquid crystalline compound is aligned and fixed to the alignment state, the alignment layer completes its role. Thus the alignment layer is not necessarily an essential component of the liquid crystal display after production. For example, a liquid crystal display having no alignment layers between the optically anisotropic layers (1) and (2) can be produced by transferring the optically anisotropic layer (1) in the fixed alignment state to the optically anisotropic layer (2), though the alignment layer is generally formed between the optically anisotropic layers (1) and (2).

The alignment layer may be formed by a method of rubbing an organic compound (preferably a polymer), a method of oblique-depositing an inorganic compound, a method of forming a layer with microgrooves, or a method of accumulating an organic compound (e.g., ω-tricosanic acid, dioctadecylmethylammonium chloride, methyl stearate) using Langmuir-Blodgett process to form an LB film. Further, the alignment layer may be a known one formed by applying an electric field, a magnetic field, or a light irradiation to obtain the aligning function.

The alignment layer is preferably formed by subjecting a polymer to the rubbing treatment. The rubbing treatment may be a known one common for aligning liquid crystals of liquid crystal displays. Thus, the surface of the alignment layer may be rubbed with paper, gauze, felt, rubber, nylon, polyester fiber, etc. in a constant direction to obtain the alignment. The rubbing treatment is generally carried out such that the layer is rubbed several times with a cloth woven from fibers with uniform length and width.

The polymer for the alignment layer essentially has a molecular structure with a function of aligning the liquid crystal molecules.

It is preferred that polymer for the alignment layer has a function of fixing the alignment of the liquid crystal molecules in addition to the function of aligning the liquid crystal molecules. For example, it is preferred that a side chain having a crosslinking functional group such as a double bond group is connected to the main chain of the polymer, or a crosslinking functional group having a function of aligning the liquid crystal molecules is introduced to the side chain of the polymer.

It is preferred that the polymer for the alignment layer is capable of crosslinking per se or can be crosslinked by using a crosslinking agent. The crosslinkable polymer is described in JP-A-8-338913, Paragraph 0022. Examples of the crosslinkable polymers include polymethacrylates, polystyrenes, polyolefins, polyvinyl alcohols, modified polyvinyl alcohols, poly(N-methylolacrylamide)s, polyesters, polyimides, polyvinyl acetates, carboxymethylcellulose, polycarbonates, and copolymers thereof.

A silane coupling agent may be used as the polymer. Preferred as the polymer are water-soluble polymers such as poly(N-methylolacrylamide)s, carboxymethylcelluloses, gelatins, polyvinyl alcohols, and modified polyvinyl alcohols, more preferred are gelatins, polyvinyl alcohols, and modified polyvinyl alcohols, and the most preferred are polyvinyl alcohols and modified polyvinyl alcohols. Two or more of these polymers may be used in combination.

The saponification degree of the polyvinyl alcohol is preferably 70 to 100%, more preferaby 80 to 100%. The polymerization degree of the polyvinyl alcohol is preferably 100 to 5,000.

The side chain having the function of aligning the liquid crystal molecules generally contains a hydrophobic group as a functional group. Specifically the type of the functional group is selected based on the type of the liquid crystal molecules and the desired alignment state.

The modified polyvinyl alcohol has a modification group, which may be introduced by copolymerization modification, chain transfer modification, or block polymerization modification. Examples of the modification groups include hydrophilic groups such as carboxylic acid groups, sulfonic acid groups, phosphonic acid groups, amino groups, ammonio groups, amido groups, and thiol groups; hydrocarbon groups having 10 to 100 carbon atoms; fluorine-substituted hydrocarbon groups; alkylthio groups; polymerizable groups such as unsaturated polymerizable groups, epoxy groups, and aziridinyl groups; and alkoxysilyl groups such as trialkoxysilyl, dialkoxy-silyl, or monoalkoxy-silyl groups.

The modified polyvinyl alcohol is described in JP-A-2000-155216 and JP-A-2002-62426.

By connecting a side chain having a crosslinking functional group to the main chain of the polymer of the alignment layer or by introducing a crosslinking functional group to the side chain having the function of aligning the liquid crystal molecules, the polymer of the alignment layer can be copolymerized with the polyfunctional monomer of the optically anisotropic layer (1). As a result, strong covalent bonds are formed not only between the polyfunctional monomers, but also between the polymers of the alignment layer and between the polyfunctional monomer and the polymer of the alignment layer. Thus, the strength of the optical compensatory sheet can be remarkably improved by introducing the crosslinking functional group to the polymer of the alignment layer.

The crosslinking functional group of the alignment layer polymer is preferably a polymerizable group as the polyfunctional monomer. The crosslinking functional group is described in JP-A-2000-155216, Paragraph 0080 to 0100.

The alignment layer polymer may be crosslinked by a crosslinking agent regardless of using the crosslinking functional group. Examples of the crosslinking agents include aldehydes, N-methylol compounds, dioxane derivatives, compounds capable of activating a carboxyl group, active vinyl compounds, active halogen compounds, isoxazoles, and dialdehyde starchs. Two or more types of the crosslinking agents may be used in combination. The crosslinking agent is described in JP-A-2002-62426. The crosslinking agent is preferably a high-reactive aldehyde, particularly glutaraldehyde.

The ratio of the crosslinking agent to the polymer is preferably 0.1 to 20% by mass, more preferably 0.5 to 15% by mass. The content of the unreacted crosslinking agent remaining in the alignment layer is preferably 1.0% by mass or less, more preferably 0.5% by mass or less. By reducing the content of the residual crosslinking agent, a sufficient durability can be obtained without reticulation even in a case where the liquid crystal display is used or left under a high-temperature high-humidity environment over a long period of time.

The alignment layer may be formed by the steps of applying a coating liquid containing the above polymer and the crosslinking agent to the optically anisotropic layer (2), heat-drying (crosslinking) the applied liquid, and subjecting it to a rubbing treatment. The crosslinking reaction is preferably carried out after applying the liquid to the optically anisotropic layer (2). In the case of using the water-soluble polymer such as the polyvinyl alcohol as a material for the alignment layer, the coating liquid preferably contains a mixed solvent of water and an organic solvent having a defoaming property such as methanol. In a mixed solvent of water and methanol, the ratio of methanol to the entire solvent is preferably 1% by mass or more, more preferably 9% by mass or more. Thus foaming of the liquid can be prevented by adding the organic solvent, whereby defects of the surfaces of the alignment layer and optically anisotropic layer (1) can be extremely reduced.

The method for applying the coating liquid for the alignment layer is preferably a spin coating method, a dip coating method, a curtain coating method, an extrusion coating method, a rod coating method, or a roll coating method, particularly preferably a rod coating method.

The applied coating liquid preferably has a thickness of 0.1 to 10 μm after drying.

The temperature for the heat drying may be 20 to 110° C.. The temperature is preferably 40 to 100° C., more preferably 60 to 100° C., to form a sufficiently crosslinked structure. The drying time is preferably 1 minute to 36 hours, more preferably 1 to 30 minutes, further preferably 1 to 3 minutes. The pH value of the coating liquid is preferably controlled appropriately depending on the crosslinking agent. In the case of using glutaraldehyde, the pH value is preferably 4.5 to 5.5.

[Optically Anisotropic Layer (2)]

The optically anisotropic layer (2) has at least one polymer film. The polymer film may not be composed only of a polymer but contains a various additive such as a plasticizer or a retardation increasing agent in addition to a polymer. A plurality of polymer films may be used for forming the optically anisotropic layer (2) to achieve the optical anisotropy according to the invention. The optical anisotropy can be achieved by using only one polymer film, and thus it is particularly preferred that the optically anisotropic layer (2) be composed of one polymer film.

Specifically the Rth value of the optically anisotropic layer (2) is preferably within a range of 100 to 300 nm, more preferably within a range of 100 to 165 nm, at a wavelength of 550 nm. The Re value of the optically anisotropic layer (2) is preferably 20 to 60 nm, more preferably 20 to 50 nm.

The polymer film preferably contains a cellulose-based polymer, more preferably contains a cellulose ester, further preferably contains a lower fatty acid ester of cellulose. The lower fatty acid is a fatty acid having at most 6 carbon atoms. The cellulose ester is preferably a cellulose acylate with 2 to 4 carbon atoms, and more preferably a cellulose acetate. A mixed fatty acid ester such as cellulose acetate propionate or cellulose acetate butyrate may be used as the cellulose ester.

The viscosity average polymerization degree (DP) of the cellulose acetate is preferably 250 or more, more preferably 290 or more. It is preferred that the cellulose acetate has a narrow molecular weight distribution of Mw/Mn measured by a gel permeation chromatography, in which Mw is a weight average molecular weight and Mn is a number average molecular weight. Specifically, the value of Mw/Mn is preferably 1.00 to 1.70, more preferably 1.30 to 1.65, further preferably 1.40 to 1.60.

The acetylation degree of the cellulose acetate is preferably 55.0 to 62.5%, more preferably 57.0 to 62.0%.

The acetylation degree means the amount of connected acetic acid moieties per unit mass of cellulose. The acetylation degree is obtained by measurement and calculation of ASTM D-817-91 (test method for cellulose acetate, etc.)

In the cellulose acetate, generally the hydroxyl groups at the 2-, 3-, and 6-positions of cellulose are not equally substituted, and the substitution degree at the 6-positions is lower. In the cellulose acetate for the optically anisotropic layer (2), the substitution degree at the 6-positions is preferably equal to or higher than those at the 2- and 3-positions.

The ratio of the substitution degree at the 6-positions to the total substitution degree at the 2-, 3-, and 6-positions is preferably 30 to 40%, more preferably 31 to 40%, most preferably 32 to 40%. The substitution degree at the 6-positions is preferably 0.88 or more.

The cellulose acylate and synthesizing methods thereof are described in *Hatsumei Kyokai Kokai Giho* (*JIII Journal of Technical Disclosure*), No. 2001-1745, Page 9.

The retardation of the cellulose acetate is controlled generally by a method of applying an external force, such as a stretching method. A retardation increasing agent may be added to the polymer film to control the optical anisotropy. It is preferred that an aromatic compound having at least two aromatic rings is used as the retardation increasing agent. The amount of the aromatic compound is preferably within the range of 0.01 to 30 parts by mass per 100 parts by mass of the polymer. Two of more aromatic compounds may be used in combination. The aromatic rings of the aromatic compound include aromatic hydrocarbon rings and aromatic heterocycles.

The retardation increasing agent is described in European Patent No. 0911656, JP-A-2000-111914, and JP-A-2000-275434.

The hygroscopic expansion coefficient of the cellulose acetate film is preferably $30 \times 10^{-5}$/% relative humidity or less, more preferably $15 \times 10^{-5}$/% relative humidity or less, most preferably $10 \times 10^{-5}$/% relative humidity or less.

The hygroscopic expansion coefficient is generally at least $1.0 \times 10^{-5}$/% relative humidity though a smaller hygroscopic expansion coefficient is more preferred. The hygroscopic expansion coefficient represents length variation of a sample by changing relative humidity at a constant temperature. By controlling the hygroscopic expansion coefficient, frame-like increase of the transmittance (the light leakage due to distortion) can be prevented while maintaining the optical compensation function of the optical compensatory sheet.

In an example of measuring the hygroscopic expansion coefficient, first a sample having a width of 5 mm and a length of 20 mm is cut out from a produced polymer film, and hung under conditions of 25° C. and 20% relative humidity ($R_0$) while fixing one end of the sample. A 0.5-g weight was attached to the other end of the sample and left for 10 minutes, and the length ($L_0$) of the sample is measured. Then, the humidity is changed to 80% relative humidity ($R_1$) while keeping the temperature at 25° C., and the length ($L_1$) is measured. The hygroscopic expansion coefficient can be calculated using the following equation. 10 samples of a polymer film are subjected to the measurement to obtain an average value.

Hygroscopic expansion coefficient [/% relative humidity]=$\{(L_1-L_0)/L_0\}/(R_1-R_0)$ To reduce the dimensional change of the cellulose acetate film due to moisture absorption, a hydrophobic compound is preferably added to the film. The hydrophobic compound may be in the form of particles. The hydrophobic compound is preferably selected from plasticizers and degradation inhibitors. The hydrophobic compound preferably has an aliphatic or aromatic hydrocarbon group as a hydrophobic group. The amount of the hydrophobic compound is preferably 0.01 to 10% by mass based on the resultant polymer solution (dope).

A method of reducing the free volume in the polymer film is also effective for reducing the dimensional change due to moisture absorption. For example, the free volume is reduced when a residual solvent amount is lower in a solvent casting method to be hereinafter described. The polymer film is preferably dried under such a condition that the residual solvent amount is 0.01 to 1.00% by mass based on the polymer film.

Examples of additives for the polymer film include ultraviolet resistant agents, releasing agents, antistatic agents, degradation inhibitors (such as antioxidants, peroxide decomposing agents, radical inhibitors, metal deactivators, acid scavengers, and amines), and infrared absorbents.

In a case where the polymer film has a plurality of layers, the layers may contain different types and amounts of the additives. The additives are described in *Hatsumei Kyokal Kokai Giho* No. 2001-1745, Page 16 to 22. The additive content of the polymer film is generally 0.001 to 25% by mass.

The cellulose acetate film is preferably produced by a solvent casting method. In the solvent casting method, a solution (dope) prepared by dissolving a polymer material in an organic solvent is used for producing the film.

The organic solvent preferably contains a solvent selected from ethers having 3 to 12 carbon atoms, ketones having 3 to 12 carbon atoms, esters having 3 to 12 carbon atoms, and halogenated hydrocarbons having 1 to 6 carbon atoms. The ethers, ketones, and esters may have a cyclic structure. A compound having at least two of ether, ketone, and ester functional groups (—O—, —CO—, and —COO—) may be used as the organic solvent. The organic solvent may have another functional group such as an alcoholic hydroxyl group. The carbon number of the organic solvent having two or more types of functional groups may be within the range of the compound having one of the functional group.

Examples of ethers having 3 to 12 carbon atoms include diisopropyl ether, dimethoxymethane, dimethoxy ethane, 1,4-dioxane, 1,3-dioxolane, tetrahydrofuran, anisole, and phenetole. Examples of ketones having 3 to 12 carbon atoms include acetone, methyl ethyl ketone, diethyl ketone, diisobutyl ketone, cyclohexanone, and methylcyclohexanone. Examples of esters having 3 to 12 carbon atoms include ethyl formate, propyl formate, pentyl formate, methyl acetate, ethyl acetate, and pentyl acetate. Examples of the organic solvents having two or more types of functional groups include 2-ethoxyethyl acetate, 2-methoxyethanol, and 2-butoxyethanol. The carbon number of the halogenated hydrocarbon is preferably 1 or 2, most preferably 1. A halogen of the halogenated hydrocarbon is preferably chlorine. The ratio of halogen-substituted hydrogen in the halogenated hydrocarbon is preferably 25 to 75 mol %, more preferably 30 to 70 mol %, further preferably 35 to 65 mol %, most preferably 40 to 60 mol %. Methylene chloride is typically used as the halogenated hydrocarbon. Two or more of organic solvents may be used as a mixture.

The cellulose acetate solution may be prepared by a common method. In the common method, the preparation is carried out at 0° C. or higher (at an ordinary temperature or a high temperature). The solution may be prepared using a method and apparatus for preparing a dope by solvent casting. In the common method, the organic solvent is preferably a halogenated hydrocarbon, particularly methylene chloride. The amount of the cellulose acetate is controlled such that the resulting solution has a cellulose acetate content of 10 to 40% by mass. The cellulose acetate content is further preferably 10 to 30% by mass. Additives to be hereinafter described may be added to the organic solvent (the main solvent). The solution can be prepared by stirring the cellulose acetate and organic solvent at an ordinary temperature (0 to 40° C.). In a case where the solution has a high concentration, the solution may be stirred under pressure and heat conditions. Specifically the cellulose acetate and the organic solvent are put in a pressurized vessel and closed, and are then stirred under increased pressure while heating at a temperature higher than the boiling point of the solvent without boiling the solvent. The heating temperature is preferably 40° C. or higher, more preferably 60 to 200° C., further preferably 80 to 110° C.

The components may be roughly premixed and then put in a vessel. The components may be separately added to the vessel. The vessel preferably has such a structure that the components can be stirred. The inner pressure of the vessel may be increased by introducing an inert gas such as nitrogen gas. Alternatively the inner pressure may be increased by heating and increasing the solvent vapor pressure. The components may be added under the increased pressure after the vessel is closed. In the case of the heating, the vessel is preferably heated from the outside. For example, the vessel may be heated by a jacket type heating apparatus. Further, the vessel may be heated such that a plate heater is placed on the outside of the vessel, a pipe is connected thereto, and a liquid is circulated in the pipe. The components are preferably stirred by an impeller formed in the vessel. The impeller preferably has such a length that it reaches the vicinity of the vessel wall. A scrape blade is preferably formed on the end of the impeller to interchange the liquid on the vessel wall. The vessel may contain a measuring instrument such as a pressure indicator or a thermometer. Each component is dissolved in the solvent in the vessel. The prepared dope is isolated from the vessel after cooling, or is isolated and then cooled by a heat exchanger, etc.

The solution may be prepared by a cooling dissolution method. By the cooling dissolution method, the cellulose acetate can be dissolved even in an organic solvent, in which it is hardly dissolved by a common method. In the case of using a solvent in which the cellulose acetate can be dissolved by a common method, a uniform solution can be rapidly obtained by the cooling dissolution method. In the cooling dissolution method, first the cellulose acetate is gently added to the organic solvent while stirring at room temperature. The amount of the cellulose acetate is preferably controlled such that the cellulose acetate content of the mixture is 10 to 40% by mass. The cellulose acetate content is more preferably 10 to 30% by mass. Further, additives to be hereinafter described may be added to the mixture.

Then the mixture is preferably cooled to −100 to −10° C., the temperature being more preferably −80 to −10° C., further preferably −50 to −20° C., most preferably −50 to −30° C. The mixture may be cooled in dry ice, a methanol bath (−75° C.), a cooled diethylene glycol solution (−30 to −20° C.), etc. In the cooling step, the mixture of the cellulose acetate and the organic solvent is solidified. The cooling rate is preferably 4° C./minute or higher, more preferably 8° C./minute or higher, most preferably 12° C./minute or higher. The higher cooling rate of 100° C./second, etc. is furthermore preferred. The cooling rate is a value obtained by dividing the temperature difference between the start and end of the cooling by the time required for completing the cooling.

The resulting mixture is preferably heated to 0 to 200° C., the temperature being more preferably 0 to 150° C., further preferably 0 to 120° C., most preferably 0 to 50° C., so that the cellulose acetate is dissolved in the organic solvent. The mixture may be heated by only leaving at room temperature or by a heating bath. The heating rate is preferably 4° C./minute or higher, more preferably 8° C./minute or higher, most preferably 12° C./minute or higher. The higher heating rate of 100° C./second, etc. is furthermore preferred. The heating rate is a value obtained by dividing the temperature difference between the start and end of the heating by the time required for completing the heating. A uniform solution can be obtained in this manner. In a case where the dissolution is insufficient, the steps of cooling and heating may be repeated. The dissolution can be evaluated only by visually observing the appearance of the solution.

In the cooling dissolution method, a closable vessel is preferably used to prevent water contamination due to dew condensation in the cooling step. In the cooling and heating operation, the dissolving time can be shortened by cooling under increased pressure and heating under reduced pressure, and it is preferred that a pressure resistant vessel is used in this case. When a cellulose acetate having an acetylation degree of 60.9% and a viscosity average polymerization degree of 299 is dissolved in methyl acetate by the cooling dissolution method, thus prepared 20% by mass solution has about 33° C. of a pseudo phase transition point between the sol and gel states, obtained by differential scanning calorimetry (DSC), and the solution is in the uniform gel state at the point or lower. Thus, the solution has to be maintained at the pseudo phase transition temperature or higher, preferably at a temperature of about 10° C. higher than the gel phase transition temperature. It should be noted that the pseudo phase transition temperature depends on the acetylation degree and viscosity average polymerization degree of the cellulose acetate, the solution concentration, and the organic solvent.

The cellulose acetate film may be produced from the cellulose acetate solution (the dope) by a solvent casting method. The dope is cast on a drum or band, and the solvent is evaporated to form the film. It is preferred that the concentration of the dope is controlled before the casting such that the solid content is 18 to 35%. The surface of the drum or band is preferably in the mirror finished state. The casting and drying steps in the solvent casting method are described in U.S. Pat. Nos. 2,336,310, 2,367,603, 2,492,078, 2,492,977, 2,492,978, 2,607,704, 2,739,069, and 2,739,070, British Patent Nos. 640731 and 736892, JP-B-45-4554, JP-B-49-5614, JP-A-60-176834, JP-A-60-203430, and JP-A-62-115035. The dope is preferably cast on the drum or band having a surface temperature of 10° C. or lower. The dope is preferably air-dried for 2 seconds or more after the casting. The resultant film may be peeled off from the drum or band and further dried by hot air while successively changing the air temperature within the range of 100 to 160° C. to evaporate the residual solvent. This method is described in JP-B-5-17844. The time between the casting and the peeling can be reduced by using the method. To carry out the method, the dope has to be converted into a gel at the surface temperature of the drum or band in the casting step.

The prepared cellulose acylate liquid (the dope) may be formed into a film by double or more casting. In this case, the cellulose acylate film is preferably formed by the solvent casting method. The dope is cast on a drum or band, and the solvent is evaporated to form the film. It is preferred that the concentration of the dope is controlled before the casting such that the solid content is 10 to 40%. The surface of the drum or band is preferably in the mirror finished state.

In the case of casting a plurality of the cellulose acylate liquids, the film may be formed by casting the cellulose acylate liquids into layers respectively from a plurality of casting openings formed at some intervals in the moving direction of a support as described in JP-A-61-158414, JP-A-1-122419, and JP-A-11-198285, etc. The film may be formed by casting the cellulose acylate liquids from two casting openings as described in JP-B-60-27562, JP-A-61-94724, JP-A-61-947245, JP-A-61-104813, JP-A-61-158413, and JP-A-6-134933. Further, the film may be formed in a cellulose acylate casting method in which flow of a high-viscosity cellulose acylate liquid with a low-viscosity cellulose acylate liquid, and high- and low-viscosity cellulose acylate the liquids are extruded simultaneously as described in JP-A-56-162617.

Further, 2 casting openings may be used such that a film is formed on a support by a first casting opening, the film is peeled off, and another film is formed on the support side of the film by a second casting opening as described in JP-B-44-20235, etc. The cellulose acylate liquids for the casting may be the same or different liquids without particular restrictions. To form a plurality of cellulose acylate layers with desired functions, the cellulose acylate liquids suitable for the functions may be extruded from the casting openings respectively. The cellulose acylate liquid may be cast together with another liquid for another functional layer such as an adhesive layer, dye layer, antistatic layer, antihalation layer, UV absorbing layer, or polarizing layer simultaneously.

In the case of conventional single liquid layers, extrusion of a high-concentration high-viscosity cellulose acylate liquid is required to obtain a desired film thickness. In this case, the cellulose acylate liquid is poor in the stability, thereby suffering problems of generation of solids, spit defects, poor flatness, etc. In view of solving the problems, a plurality of high-viscosity cellulose acylate liquids can be extruded onto a support by casting the liquids simultaneously from casting openings, resulting in excellent flatness and surface properties. Further, the drying load can be reduced by using high-concentration cellulose acylate liquids, thereby increasing the speed of producing the film.

A plasticizer may be added to the cellulose acetate film to improve the mechanical properties and drying speed. The plasticizer may be a phosphoric acid ester or a carboxylic acid ester. Examples of the phosphoric acid esters include triphenyl phosphate (TPP), biphenyldiphenyl phosphate, and tricresyl phosphate (TCP). Typical carboxylic acid esters include phthalate esters and citrate esters. Examples of the phthalate esters include dimethyl phthalate (DMP), diethyl phthalate (DEP), dibutyl phthalate (DBP), dioctyl phthalate (DOP), diphenyl phthalate (DPP), and diethylhexyl phthalate (DEHP). Examples of the citrate esters include triethyl O-acetylcitrate (OACTE) and tributyl O-acetylcitrate (OACTB). Examples of the other carboxylic acid esters include butyl oleate, methylacetyl ricinoleate, dibutyl sebacate, and various trimellitic acid esters. The plasticizer is preferably a phosphoric acid ester. The mass ratio of the plasticizer to the cellulose ester is preferably 0.1 to 25% by mass, more preferably 1 to 20% by mass, most preferably 3 to 15% by mass.

The cellulose acetate film is preferably subjected to a surface treatment. The surface treatments include corona discharge treatments, glow discharge treatments, flame treatments, acid treatments, alkali saponification treatments, and ultraviolet ray irradiation treatments. The surface treatments are described in *Hatsumei Kyokai Kokai Giho* No. 2001-1745, Page 30 to 32.

The alkali saponification treatment may be achieved by soaking the cellulose acetate film in a saponification solution or by coating the cellulose acetate film with a saponification solution, and is preferably carried out by the coating method. Examples of the coating methods include dip coating methods, curtain coating methods, extrusion coating methods, bar coating methods, and E coating methods. The alkali is preferably a hydroxide of an alkali metal such as potassium or sodium. Thus, the alkali treatment solution preferably contains the alkali metal hydroxide. In the solution, the normal concentration of the hydroxide ions is preferably 0.1 to 3.0 N.

A solvent excellent in wetting properties to the film, a surfactant, or a wetting agent such as a diol or glycerin may be added to the alkali treatment solution, to improve the solution with respect to the wetting properties to the second optically anisotropic layer and the stability. The solvent excellent in the wetting properties to the film is preferably an alcohol such as isoprodyl alcohol, n-butanol, methanol, or ethanol. The additives for the alkali treatment solution are described in JP-A-2002-82226 and WO 02/46809.

Instead of or in addition to the surface treatment, an undercoat layer may be formed as described in JP-A-7-333433. A plurality of the undercoat layers may be formed. For example, as described in JP-A-11-248940, a polymer layer having a hydrophobic group and a hydrophilic group is formed as a first undercoat layer, and a hydrophilic polymer layer excellent in adhesion to the alignment layer is formed thereon as a second undercoat layer.

[OCB Mode Liquid Crystal Display]

OCB mode liquid crystal cell is the bend alignment mode liquid crystal cell containing the rodlike liquid crystal molecules, and the molecules in the upper portion and the molecules in the lower portion are aligned in substantially opposite directions (symmetrically). A liquid crystal display using such a bend alignment mode liquid crystal cell is disclosed in U.S. Pat. Nos. 4,583,825 and 5,410,422. The bend alignment mode liquid crystal cell has a self-optical compensatory function because the rodlike liquid crystal molecules are symmetrically aligned. Thus, the liquid crystal mode is referred to also as an OCB (Optically Compensatory Bend) liquid crystal mode.

In the OCB mode liquid crystal cell, the alignment state is such that the rodlike liquid crystal molecules stand up in the central part of the cell and lie down in the vicinity of the substrates at the time of black level as TN mode cells.

The value of ($\Delta n \times d$) of the liquid crystal cell is preferably 50 to 1,000 nm, more preferably 500 to 1,000 nm.

EXAMPLES

The (present) invention will be described in more detail below with reference to Examples. Various changes may be made on materials, amounts, ratios, treatment details, treatment procedures, etc. in Examples without departing from the scope of the invention. Thus, the following specific examples should not be considered restrictive.

Example 1

(Preparation of Cellulose Acetate Solution)

The following composition was added to a mixing tank and stirred under heating to dissolve the components, so that a cellulose acetate solution was prepared.

| Composition of cellulose acetate solution | |
|---|---|
| Cellulose acetate having acetylation degree of 60.9% | 100 parts by mass |
| Triphenyl phosphate | 7.8 parts by mass |
| Biphenyldiphenyl phosphate | 3.9 parts by mass |
| Methylene chloride | 300 parts by mass |
| Methanol | 45 parts by mass |

4 parts by mass of cellulose acetate having an acetylation degree of 60.9% (a linter), 25 parts by mass of the following retardation increasing agent, 0.5 parts by mass of silica particles having an average particle size of 20 nm, 80 parts by mass of methylene chloride, and 20 parts by mass of methanol were added to another mixing tank, and stirred under heating to prepare a retardation increasing agent solution.

Retardation increasing agent (Preparation of Cellulose Acetate Film)

18.5 parts by mass of the retardation increasing agent solution was mixed with 470 parts by mass of the cellulose acetate solution, and the resultant mixture was well stirred to prepare a dope. The mass ratio of the retardation increasing agent to the cellulose acetate was 3.5%. The film containing 35% by mass of residual solvent was peeled from the band, and transversely stretched at a stretch ratio of 38% using a film tenter at 140° C. After removing a clip, the resulting film was dried at 130° C. for 45 seconds to prepare a cellulose acetate film. The cellulose acetate film had a residual solvent content of 0.2% by mass and a thickness of 92 μm.

(Measurement of Optical Properties)

The cellulose acetate film was measured with respect to an Re value at a wavelength of 550 nm by using an automatic birefringence meter KOBRA 21ADH manufactured by Oji Scientific Instruments. Further, the Re values of the cellulose acetate film were measured at elevation angles of 40° and −40° using an in-plane retardation axis of as an elevation axis (Table 1). The refractive index ny in the phase advance axis direction and refractive index nz in the thickness direction were calculated using parameters of the thickness and refractive index nx in the retardation axis direction in view of fitting the measured values Re(550 nm), Re(40°), and −Re(40°), whereby the Rth value was determined. The results are shown in Table 1, and also results of Examples 2 to 4 and Comparative Examples 1 and 2 are shown therein.

(Saponification of Cellulose Acetate Film)

A 1.5 mol/L potassium hydroxide isopropyl alcohol solution was applied to one surface of the produced cellulose acetate film such that the application amount was 25 ml/m², left at 25° C. for 5 seconds, washed with water flow for 10 seconds, and dried by air flow at 25° C. Only the one surface of the cellulose acetate film was saponified in this manner.

(Formation of Alignment Layer)

An alignment layer coating liquid having the following composition was applied to the saponified surface of the cellulose acetate film (the optically anisotropic layer (2)) by a #14 wire bar coater at a ratio of 24 ml/m². The applied liquid was dried by 60° C. hot air for 60 seconds and further dried by 90° C. hot air for 150 seconds.

Then the resulting film was subjected to a rubbing treatment at an angle of 45° against the stretching direction of the optically anisotropic layer (2), which was approximately equal to the retardation axis direction.

| Composition of alignment layer coating liquid | |
| --- | --- |
| Following modified polyvinyl alcohol | 10 parts by mass |
| Water | 371 parts by mass |
| Methanol | 119 parts by mass |
| Glutaraldehyde (crosslinking agent) | 0.5 parts by mass |

Modified polyvinyl alcohol

—(CH$_2$—CH)$_{87.8}$— —(CH$_2$—CH)$_{0.2}$— —(CH$_2$—CH)$_{12.0}$—
 |  |  |
 OH  O  O
  |  |
  CO  CO
  |  |
  (ring)  CH$_3$
  |
  O—(CH$_2$)$_4$—O—CO—CH=CH$_2$ (Formation of Optically Anisotropic Layer (1))

91 parts by mass of the following discotic compound, 9 parts by mass of an ethylene oxide-modified trimethylolpropane triacrylate V#360 available from Osaka Organic Chemical Industry Ltd., 1.5 parts by mass of a cellulose acetate butyrate CAB531-1 available from Eastman Chemicals Co., 0.91 parts by mass of a mixture of monoethyl citrare and diethyl citrare, 3 parts by mass of a photopolymerization initiator IRGACURE 907 available from Ciba-Geigy, and 1 part by mass of a sensitizer KAYACURE DETX available from Nippon Kayaku Co., Ltd. were dissolved in 204.0 parts by mass of methyl ethyl ketone to obtain a coating liquid. The coating liquid was applied to the alignment layer by a #2.7 wire bar at an application rate of 4.7 ml/m². This was attached to a metal frame and heated at 130° C. for 2 minutes in a constant temperature bath to align the discotic compound. The resultant laminate was then irradiated with ultraviolet ray at 90° C. for 1 minute by using a 120-W/cm high-pressure mercury vapor lamp to polymerize the discotic compound, and was cooled to the room temperature. Thus an optically anisotropic layer (1) was formed to prepare an optical compensatory sheet.

Discotic (liquid crystalline) compound

R: —O—CO—(ring)—O—(CH$_2$)$_4$—O—CO—CH=CH$_2$

The Re value of the optically anisotropic layer (1) was measured at an wavelength of 550 nm by using an automatic birefringence meter KOBRA 21ADH manufactured by Oji Scientific Instruments. Further, the retardation values Re(40) and Re(−40) were measured at elevation angles of 40° and −40° against an in-plane retardation axis. The results are shown in Table 2, and also results of Examples 2 to 4 and Comparative Examples 1 and 2 are shown therein.

(Production of Ellipsoidal Polarizing Plate)

Iodine was adsorbed onto a stretched polyvinyl alcohol film to prepare a polarizing film. The optically anisotropic layer (2) of the produced optical compensatory sheet was bonded to one side of the polarizing film using a polyvinyl alcohol adhesive. They were positioned such that the retardation axis of the optically anisotropic layer (2) was parallel to the transmission axis of the polarizing film.

A commercially available cellulose triacetate film FUJI TAC TD80UF manufactured by Fuji Photo Film Co., Ltd. was subjected to a saponification treatment in the same manner as above, and bonded to the other side of the polarizing film (the side not having the optical compensatory sheet) by using a polyvinyl alcohol adhesive. An ellipsoidal polarizing plate was produced in this manner.

(Production of Bend Alignment Mode Liquid Crystal Cell)

A polyimide film was formed as an alignment layer on a glass substrate having an ITO electrode, and then was subjected to a rubbing treatment. Thus obtained two glass substrates were made to face each other such that the rubbing directions were parallel, and the thickness of the liquid crystal cell was controlled at 4.1 μm. A liquid crystalline compound having Δn of 0.1396 (ZLI1132 available from Merck) was injected to the liquid crystal cell, to produce a bend alignment mode liquid crystal cell.

(Production and Evaluation of Liquid Crystal Display)

The liquid crystal cell was combined with two polarizing plates to produce a liquid crystal display. The liquid crystal cell and the two polarizing plates were placed such that the optically anisotropic layer of the polarizing plates faced the substrates of the liquid crystal cell, and the rubbing direction of the liquid crystal cell was antiparallel to the rubbing direction of facing optically anisotropic layer.

The produced liquid crystal display was placed on a backlight, and 55-Hz square wave voltage was applied to the bend alignment mode liquid crystal cell. The voltage was changed, so that a voltage, at which the display showed the minimum black luminance (front luminance), was evaluated by a luminance meter TOPCON BM-5. Then the black luminance and white luminance (front luminances) at the center of the display were measured by the luminance meter TOPCON BM-5, whereby the contrast viewing angles were calculated (Table 4). The luminances of the display in the directions of up, down, left, and right were measured by the luminance meter TOPCON BM-5 while changing the voltage, and thus occurrence of tone reversal was observed. Further, the viewing angles of the display were measured by a measuring apparatus EZ-CONTRAST. The angle ranges in which image inversion was not caused are shown in Table 4, and also results of Examples 2 to 4 and Comparative Examples 1 and 2 are shown therein.

Two commercially available orthogonal polarizing plates were combined such that the transmission axes were perpendicular to each other, placed on a backlight, and evaluated with respect to color hue by SR-3 at the time of black level. As a result, the polarizing plates had v' of 0.45.

The thickness d (nm) and the value of (Δn×d)/Rth of the liquid crystal cell in the produced liquid crystal display are shown in Table 3, and also values of Examples 2 to 4 and Comparative Examples 1 and 2 are shown therein.

Example 2

470 parts by mass of the cellulose acetate film solution prepared in Example 1 and 25.5 parts by mass of the retardation increasing agent solution prepared in Example 1 were filtered respectively, and mixed and cast by a band casting apparatus. The mass ratio of the retardation increasing agent to the cellulose acetate was 4.8%. The film containing 33% by mass of residual solvent was peeled from the band, and transversely stretched at a stretch ratio of 35% using a film tenter at 140° C. After removing a clip, the resulting film was dried at 130° C. for 45 seconds to prepare a cellulose acetate film. The cellulose acetate film had a residual solvent content of 0.2% by mass and a thickness of 92 μm.

The optical properties of the cellulose acetate film were measured in the same manner as Example 1.

A 1.5 mol/L potassium hydroxide isopropyl alcohol solution was applied to one surface of the produced cellulose acetate film, left at 25° C. for 5 seconds, washed with water flow for 10 seconds, and dried by air flow at 25° C. Only the one surface of the cellulose acetate film was saponified in this manner.

(Formation of Alignment Layer and Optically Anisotropic Layer)

An alignment layer was formed on the saponified surface of the cellulose acetate film (the optically anisotropic layer (2)) and subjected to a rubbing treatment in the same manner as Example 1.

An optically anisotropic layer was formed on the rubbing-treated alignment layer in the same manner as Example 1 except for using a #3.4 wire bar coater.

An optical compensatory sheet was produced in this manner.

The optical compensatory sheet was evaluated in the same manner as Example 1.

(Production of Ellipsoidal Polarizing Plate)

Iodine was adsorbed onto a stretched polyvinyl alcohol film to prepare a polarizing film. The optically anisotropic layer (2) of the above optical compensatory sheet was bonded to one side of the polarizing film using a polyvinyl alcohol adhesive. They were positioned such that the retardation axis of the optically anisotropic layer (2) was parallel to the transmission axis of the polarizing film.

A commercially available cellulose triacetate film FUJI TAC TD80UF manufactured by Fuji Photo Film Co., Ltd. was subjected to a saponification treatment in the same manner as above, and bonded to the other side of the polarizing film (the side not having the optical compensatory sheet) by using a polyvinyl alcohol adhesive. An ellipsoidal polarizing plate was produced in this manner.

(Production of Liquid Crystal Display)

A bend alignment cell was produced in the same manner as Example 1 except that the cell had a thickness of 4.6 μm, and bonded to and sandwiched between two ellipsoidal polarizing plates produced above. They were placed such that the optically anisotropic layer of the ellipsoidal polarizing plate faced the cell substrate, and the rubbing direction of the liquid crystal cell was antiparallel to the rubbing direction of the facing optically anisotropic layer.

The liquid crystal display was evaluated in the same manner as Example 1.

Example 3

470 parts by mass of the cellulose acetate film solution prepared in Example 1 and 27.0 parts by mass of the retardation increasing agent solution prepared in Example 1 were filtered respectively, and mixed and cast by a band casting apparatus. The mass ratio of the retardation increasing agent to the cellulose acetate was 5.0%. The film containing 32% by mass of residual solvent was peeled from the band, and transversely stretched at a stretch ratio of 32% using a film tenter at 140° C. After removing a clip, the resulting film was dried at 130° C. for 45 seconds to prepare a cellulose acetate film. The cellulose acetate film had a residual solvent content of 0.2% by mass and a thickness of 92 μm.

The optical properties of the cellulose acetate film were measured in the same manner as Example 1. The results are shown in Table 1.

A 1.5 mol/L potassium hydroxide isopropyl alcohol solution was applied to one surface of the produced cellulose acetate film at a rate of 25 ml/m², left at 25° C. for 5 seconds, washed with water flow for 10 seconds, and dried by air flow at 25° C. Only the one surface of the cellulose acetate film was saponified in this manner.

(Formation of Alignment Layer and Optically Anisotropic Layer)

An alignment layer was formed on one surface of the saponified surface of the cellulose acetate film (the optically anisotropic layer (2)) and subjected to a rubbing treatment in the same manner as Example 1.

An optically anisotropic layer was formed on the rubbing treated alignment layer in the same manner as Example 1 except for using a #3.6 wire bar coater.

An optical compensatory sheet was produced in this manner.

The optical compensatory sheet was evaluated in the same manner as Example 1.

(Production of Ellipsoidal Polarizing Plate)

Iodine was adsorbed onto a stretched polyvinyl alcohol film to prepare a polarizing film. The optically anisotropic layer (2) of the above optical compensatory sheet was bonded to one side of the polarizing film using a polyvinyl alcohol adhesive. They were positioned such that the retardation axis of the optically anisotropic layer (2) was parallel to the transmission axis of the polarizing film.

A commercially available cellulose triacetate film FUJI TAC TD80UF manufactured by Fuji Photo Film Co., Ltd. was subjected to a saponification treatment in the same manner as above, and bonded to the other side of the polarizing film (the side not having the optical compensatory sheet) by using a polyvinyl alcohol adhesive. An ellipsoidal polarizing plate was produced in this manner.

(Production of Liquid Crystal Display)

A bend alignment cell was produced in the same manner as Example 1 except that the cell had a thickness of 5.0 μm, and bonded to and sandwiched between two ellipsoidal polarizing plates produced above. They were placed such that the optically anisotropic layer of the ellipsoidal polarizing plate faced the cell substrate, and the rubbing direction of the liquid crystal cell was antiparallel to the rubbing direction of the facing optically anisotropic layer.

The liquid crystal display was evaluated in the same manner as Example 1.

Example 4

470 parts by mass of the cellulose acetate film solution prepared in Example 1 and 33.0 parts by mass of the retardation increasing agent solution prepared in Example 1 were filtered respectively, and mixed and cast by a band casting apparatus. The mass ratio of the retardation increasing agent to the cellulose acetate was 6.2%. The film containing 30% by mass of residual solvent was peeled from the band, and transversely stretched at a stretch ratio of 30% using a film tenter at 140° C. After removing a clip, the resulting film was dried at 130° C. for 45 seconds to prepare a cellulose acetate film. The cellulose acetate film had a residual solvent content of 0.2% by mass and a thickness of 92 μm.

The cellulose acetate film was evaluated in the same manner as Example 1.

A 1.5 mol/L potassium hydroxide isopropyl alcohol solution was applied to one surface of the produced cellulose acetate film at a rate of 25 ml/m², left at 25° C. for 5 seconds, washed with water flow for 10 seconds, and dried by air flow at 25° C. Only the one surface of the cellulose acetate film was saponified in this manner.

(Formation of Alignment Layer and Optically Anisotropic Layer)

An alignment layer was formed on one surface of the saponified surface of the cellulose acetate film (the optically anisotropic layer (2)) and subjected to a rubbing treatment in the same manner as Example 1.

An optically anisotropic layer was formed on the rubbing-treated alignment layer in the same manner as Example 1 except for using a #4.0 wire bar coater.

An optical compensatory sheet was produced in this manner.

The optical compensatory sheet was evaluated in the same manner as Example 1.

(Production of Ellipsoidal Polarizing Plate)

Iodine was adsorbed onto a stretched polyvinyl alcohol film to prepare a polarizing film. The optically anisotropic layer (2) of the above optical compensatory sheet was bonded to one side of the polarizing film using a polyvinyl alcohol adhesive. They were positioned such that the retardation axis of the optically anisotropic layer (2) was parallel to the transmission axis of the polarizing film.

A commercially available cellulose triacetate film FUJI TAC TD80UF manufactured by Fuji Photo Film Co., Ltd. was subjected to a saponification treatment in the same manner as above, and bonded to the other side of the polarizing film (the side not having the optical compensatory sheet) by using a polyvinyl alcohol adhesive. An ellipsoidal polarizing plate was produced in this manner.

(Production of Liquid Crystal Display)

A bend alignment cell was produced in the same manner as Example 1 except that the cell had a thickness of 5.3 μm, and bonded to and sandwiched between two ellipsoidal polarizing plates produced above. They were placed such that the optically anisotropic layer of the ellipsoidal polarizing plate faced the cell substrate, and the rubbing direction of the liquid crystal cell was antiparallel to the rubbing direction of the facing optically anisotropic layer.

The liquid crystal display was evaluated in the same manner as Example 1.

Comparative Example 1

A cellulose acetate film (an optically anisotropic layer (2)) was formed in the same manner as Example 4.

A 1.5 mol/L potassium hydroxide isopropyl alcohol solution was applied to one surface of the produced cellulose acetate film at a rate of 25 ml/m², left at 25° C. for 5 seconds, washed with water flow for 10 seconds, and dried by air flow at 25° C. only the one surface of the cellulose acetate film was saponified in this manner.

(Formation of Alignment Layer and Optically Anisotropic Layer)

An alignment layer was formed on one surface of the saponified surface of the cellulose acetate film (the optically anisotropic layer (2)) and subjected to a rubbing treatment in the same manner as Example 1.

An optically anisotropic layer (1) was formed on the rubbing-treated alignment layer in the same manner as Example 1 except for using a #4.1 wire bar coater.

An optical compensatory sheet was produced in this manner.

The optical compensatory sheet was evaluated in the same manner as Example 1.

(Production of Ellipsoidal Polarizing Plate)

Iodine was adsorbed onto a stretched polyvinyl alcohol film to prepare a polarizing film. The optically anisotropic layer (2) of the above optical compensatory sheet was bonded to one side of the polarizing film using a polyvinyl alcohol adhesive. They were positioned such that the retardation axis of the optically anisotropic layer (2) was parallel to the transmission axis of the polarizing film.

A commercially available cellulose triacetate film FUJI TAC TD80UF manufactured by Fuji Photo Film Co., Ltd. was subjected to a saponification treatment in the same manner as above, and bonded to the other side of the polarizing film (the side rot having the optical compensatory sheet) by using a polyvinyl alcohol adhesive. An ellipsoidal polarizing plate was produced in this manner.

(Production of Liquid Crystal Display)

A bend alignment cell was produced in the same manner as Example 1 except that the cell had a thickness of 2.8 μm, and bonded to and sandwiched between two ellipsoidal polarizing plates produced above. They were placed such that the optically anisotropic layer of the ellipsoidal polarizing plate faced the cell substrate, and the rubbing direction of the liquid crystal cell was antiparallel to the rubbing direction of the facing optically anisotropic layer.

The produced liquid crystal display was placed on a backlight, and 55-Hz square wave voltage was applied to the bend alignment mode liquid crystal cell. The voltage was changed, so that a voltage, at which the display showed the minimum black luminance (front luminance), was evaluated by a luminance meter TOPCON BM-5. Then the black luminance and white luminance (front luminances) at the center of the display were measured by the luminance meter TOPCON BM-5, whereby the contrast was calculated. The luminances of the display in the directions of up, down, left, and right were measured by the luminance meter TOPCON BM-5 while changing the voltage, and thus occurrence of tone reversal was observed. Further, the viewing angles of the display were measured by a measuring apparatus EZ-CONTRAST. The results are shown in Table 4.

Comparative Example 2

A cellulose acetate film was formed in the same manner as Example 1.

A 1.5 mol/L potassium hydroxide isopropyl alcohol solution was applied to one surface of the produced cellulose acetate film at a rate of 25 ml/m², left at 25° C. for 5 seconds, washed with water flow for 10 seconds, and dried by air flow at 25° C. Only the one surface of the cellulose acetate film was saponified in this manner.

(Formation of Alignment Layer and Optically Anisotropic Layer)

An alignment layer was formed on one surface of the saponified surface of the cellulose acetate film (the optically anisotropic layer (2)) are subjected to a rubbing treatment in the same manner as Example 1.

An optically anisotropic layer was formed on the rubbing-treated alignment layer in the same manner as Example 1 except for using a #2.7 wire bar coater.

An optical compensatory sheet was produced in this manner.

The optical compensatory sheet was evaluated in the same manner as Example 1.

(Production of Ellipsoidal Polarizing Plate)

Iodine was adsorbed onto a stretched polyvinyl alcohol film to prepare a polarizing film. The optically anisotropic layer (2) of the above optical compensatory sheet was bonded to one side of the polarizing film using a polyvinyl alcohol adhesive. They were positioned such that the retardation axis of the optically anisotropic layer (2) was parallel to the transmission axis of the polarizing film.

A commercially available cellulose triacetate film FUJI TAC TD80UF manufactured by Fuji Photo Film. Co., Ltd. was subjected to a saponification treatment in the same manner as above, and bonded to the other side of the polarizing film (the side not having the optical compensatory sheet) by using a polyvinyl alcohol adhesive. An ellipsoidal polarizing plate was produced in this manner.

(Production of Liquid Crystal Display)

A bend alignment cell was produced in the same manner as Example 1 except that the cell had a thickness of 5.8 μm, and bonded to and sandwiched between two ellipsoidal polarizing plates produced above. They were placed such that the optically anisotropic layer of the ellipsoidal polarizing plate faced the cell substrate, and the rubbing direction of the liquid crystal cell was antiparallel to the rubbing direction of the facing optically anisotropic layer.

The liquid crystal display was evaluated in the same manner as Example 1.

TABLE 1

| Optically anisotropic layer (2) | Re | Rth |
| --- | --- | --- |
| Example 1 | 45 | 150 |
| Example 2 | 41 | 173 |
| Example 3 | 39 | 187 |
| Example 4 | 38 | 200 |
| Comparative Example 1 | 38 | 200 |
| Comparative Example 2 | 45 | 150 |

TABLE 2

| Optically anisotropic layer (1) | Re(0) | Re(40)/Re(−40) |
| --- | --- | --- |
| Example 1 | 24 | 2.88 |
| Example 2 | 30 | 2.86 |
| Example 3 | 33 | 2.84 |
| Example 4 | 36 | 2.81 |
| Comparative Example 1 | 36 | 2.81 |
| Comparative Example 2 | 24 | 2.88 |

TABLE 3

| Liquid crystal display | d (nm) | (Δn · d)/Rth |
| --- | --- | --- |
| Example 1 | 4,100 | 3.82 |
| Example 2 | 4,600 | 3.71 |
| Example 3 | 5,000 | 3.73 |
| Example 4 | 5,300 | 3.70 |
| Comparative Example 1 | 2,800 | 1.95 |
| Comparative Example 2 | 5,800 | 5.40 |

TABLE 4

| Liquid crystal display | Contrast viewing angle (range with contrast of 10 or more) | | Tone reversal viewing angle (range with no tone reversal) | |
|---|---|---|---|---|
| | Right and Left direction | Up and down direction | Right and left direction | Up and down direction |
| Example 1 | 160° | 160° | 140° | 160° |
| Example 2 | 160° | 150° | 140° | 160° |
| Example 3 | 160° | 150° | 135° | 150° |
| Example 4 | 160° | 140° | 135° | 150° |
| Comp. Example 1 | 45° | 45° | 140° | 40° |
| Comp. Example 2 | 50° | 45° | 40° | 140° |

The present disclosure relates to the subject matter contained in Japanese Patent Application No. 056359/2005 filed on Mar. 1, 2005, which is expressly incorporated herein by reference in its entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A liquid crystal display comprising a pair of polarizing films, a liquid crystal cell placed between the polarizing films, and an optical compensatory sheet placed between the liquid crystal cell and at least one of the polarizing films, wherein the optical compensatory sheet comprises an optically anisotropic layer (1) and an optically anisotropic layer (2), and satisfies the following condition:

$$2.0 \leq (\Delta n \times d)/Rth(2) \leq 5.0$$

wherein $\Delta n$ is a birefringence of a liquid crystal molecule in the liquid crystal cell, d is a thickness (nm) of the liquid crystal cell, and Rth(2) is an Rth value of the optically anisotropic layer (2).

2. The liquid crystal display according to claim 1, wherein the optically anisotropic layer (1) has an Re value of 0 to 40 nm.

3. The liquid crystal display according to claim 1, wherein the optically anisotropic layer (2) has an Re value of 20 to 60 nm and an Rth value of 100 to 300 nm.

4. The liquid crystal display according to claim 1, wherein the optically anisotropic layer (1) has Re(40)/Re(−40) of 3 to 20 when Re values of the optically anisotropic layer (1) are each measured at an elevation angle of plus or minus 40° using a retardation axis of the optically anisotropic layer (1) as an elevation axis, and Re(40) is a larger one of the Re values and Re(−40) is the other.

5. The liquid crystal display according to claim 1, wherein the optically anisotropic layer (1) comprises a liquid crystalline compound.

6. The liquid crystal display according to claim 1, wherein the optically anisotropic layer (1) comprises a discotic compound.

7. The liquid crystal display according to claim 1, wherein the optically anisotropic layer (2) comprises a cellulose acylate film.

8. The liquid crystal display according to claim 1, wherein the liquid crystal cell is a bend alignment mode cell.

* * * * *